United States Patent
Poupart et al.

(10) Patent No.: US 11,148,747 B2
(45) Date of Patent: Oct. 19, 2021

(54) HINGE FOR FOLDING BICYCLE

(71) Applicant: DECATHLON, Villeneuve d'Ascq (FR)

(72) Inventors: François Poupart, Villeneuve d'Ascq (FR); Pierre-Louis Bassetti, Villeneuve d'Ascq (FR); David Ribeiro, Wavrin (FR)

(73) Assignee: DECATHLON, Villeneuve d'Ascq (FR)

( * ) Notice: Subject to any disclaimer, the term of this patent is extended or adjusted under 35 U.S.C. 154(b) by 42 days.

(21) Appl. No.: 16/720,175

(22) Filed: Dec. 19, 2019

(65) Prior Publication Data
US 2020/0198720 A1  Jun. 25, 2020

(30) Foreign Application Priority Data

Dec. 21, 2018 (FR) ...................................... 18 73934

(51) Int. Cl.
*B62K 15/00* (2006.01)
*B62K 21/12* (2006.01)
*E05D 11/10* (2006.01)

(52) U.S. Cl.
CPC ............ *B62K 15/006* (2013.01); *B62K 21/12* (2013.01); *E05D 11/1057* (2013.01); *E05Y 2900/50* (2013.01)

(58) Field of Classification Search
CPC ... B62K 15/006; B62K 21/12; E05D 11/1057; E05Y 2900/50
See application file for complete search history.

(56) References Cited

U.S. PATENT DOCUMENTS

| | | | | |
|---|---|---|---|---|
| 4,462,606 A | * | 7/1984 | Hon | B62K 15/006 280/278 |
| 5,440,948 A | * | 8/1995 | Cheng | B62K 15/006 280/278 |
| 5,492,350 A | * | 2/1996 | Pan | B62K 15/006 280/278 |

(Continued)

FOREIGN PATENT DOCUMENTS

| | | |
|---|---|---|
| CN | 201235892 Y | 5/2009 |
| CN | 201559774 U | 8/2010 |

(Continued)

OTHER PUBLICATIONS

English language abstract of CN 201235892.

(Continued)

*Primary Examiner* — Victor D Batson
*Assistant Examiner* — Matthew J Sullivan
(74) *Attorney, Agent, or Firm* — Bookoff McAndrews PLLC

(57) ABSTRACT

A hinge for a folding bicycle comprising a first tubular portion, a second tubular portion, the first and second tubular portions being able to assume an unfolded position and a folded position; a blocking element which can assume at least one closed position in which it retains the first tubular portion and the second tubular portion in the unfolded position, and an open position in which it allows the movement into the folded position of the first and second tubular portions; a connection part and a return device configured to bring the blocking element from its open position to its closed position.

15 Claims, 6 Drawing Sheets

(56) References Cited

U.S. PATENT DOCUMENTS

| | | | |
|---|---|---|---|
| 6,523,223 B2 * | 2/2003 | Wang | B62K 15/006 |
| | | | 16/319 |
| 7,048,660 B2 * | 5/2006 | Shahana | B62M 9/1242 |
| | | | 474/80 |
| 8,382,133 B2 * | 2/2013 | Hsu | B62K 21/12 |
| | | | 280/278 |
| 8,636,094 B1 * | 1/2014 | Conner | B62K 27/006 |
| | | | 180/204 |
| 9,371,108 B2 * | 6/2016 | Betti | B62K 15/006 |
| 9,963,186 B2 * | 5/2018 | Beistegui Chirapozu | |
| | | | B62K 15/008 |
| 10,508,667 B2 * | 12/2019 | Bianchi | B62K 15/006 |
| 10,710,669 B2 * | 7/2020 | Vodev | B62K 15/006 |
| 10,723,406 B2 * | 7/2020 | Brewer | B62K 15/006 |
| 10,899,410 B2 * | 1/2021 | Uimonen | B62K 21/12 |
| 2009/0317178 A1 * | 12/2009 | Wang | B62K 15/006 |
| | | | 403/150 |
| 2010/0135715 A1 | 6/2010 | Huang | |
| 2017/0066495 A1 | 3/2017 | Beistegui Chirapozu et al. | |
| 2019/0009856 A1 * | 1/2019 | Chong | B62K 21/24 |
| 2020/0361553 A1 * | 11/2020 | Boutakis | B62K 19/36 |

FOREIGN PATENT DOCUMENTS

| | | |
|---|---|---|
| CN | 201769968 U | 3/2011 |
| CN | 201951646 U | 8/2011 |
| CN | 201989902 U | 9/2011 |
| CN | 202138481 U | 2/2012 |
| CN | 103213638 A | 7/2013 |
| CN | 203158163 U | 8/2013 |
| CN | 203450278 U | 2/2014 |
| CN | 205632837 U | 10/2016 |
| CN | 106672142 A | 5/2017 |
| DE | 202009004945 U1 | 12/2009 |
| EP | 0058256 A1 | 8/1982 |
| EP | 2471701 A1 | 3/2011 |
| EP | 3138766 A1 | 3/2017 |
| EP | 3263434 A1 | 1/2018 |
| JP | 2009214756 A * | 9/2009 |
| JP | 3161899 U | 8/2010 |

OTHER PUBLICATIONS

English language abstract of CN 201559774.
English language abstract of CN 201769968.
English language abstract of CN 201989902.
English language abstract of CN 201951646.
English language abstract of CN 103213638.
English language abstract of CN 203158163.
English language abstract of CN 203450278.
English language abstract of CN 205632837.
English language abstract of CN 106672142.
English language abstract of JP 3161899.
English language abstract of CN 202138481.

* cited by examiner

HINGE FOR FOLDING BICYCLE

TECHNICAL FIELD

The present disclosure relates to the field of folding bicycles and more precisely to devices for folding and for retaining in the unfolded position for folding bicycles of this type.

BACKGROUND

Folding bicycles traditionally comprise at least one hinge allowing a tubular assembly consisting of a first tubular portion and a second tubular portion to be placed in the folded or unfolded position. It is known to dispose such hinges on the handlebars stem, the frame or even the saddle stem of the folding bicycle.

Folding bicycle hinges must allow the user to very rapidly place the bicycle in the folded position, to be able to store it or to reduce its bulk in order to be able to carry it easily, particularly when the user desires to travel in mass transit.

Moreover, it is indispensable to be able to retain the bicycle, and more precisely the different tubular portions, in the unfolded position, in order to avoid the bicycle folding during use and injuring the user.

Known from document DE202009004945 is a device allowing two tubular portions mounted pivoting relative to one another to be retained in the unfolded position. This device comprises a lever and a stem positioned between the two tubular portions.

In order to unfold the two tubular portions, the user must first pivot them relative to one another so as to position them in the continuation of one another. He must then push manually on the lever in order to press it against the tubular assembly, so as to block the two tubular portions relative to one another.

One disadvantage of this device is that the force exerted to press the lever against the tubular assembly can be high, so that the user can encounter difficulties with effectively blocking the connection between the two tubular portions.

In addition, this type of hinge being generally disposed near the wheels, the lever can be covered with mud. Thus auctioning the lever can dirty the hands of the user.

Moreover, if the user forgets to press the lever against the tubular assembly or does not press it correctly, the hinge risks folding during the use of the bicycle, which can prove very dangerous and can cause heavy falls.

SUMMARY

One aim of the present disclosure is to propose a hinge correcting the aforementioned problems.

To this end, the disclosure applies to a hinge for a folding bicycle comprising:

- a first tubular portion;
- a second tubular portion mounted pivoting relative to the first tubular portion around a first pivoting axis, the first and the second tubular portions being able to assume an unfolded position in which they extend in the continuation of one another and a folded position in which the form an acute angle between them;
- a blocking element having a first end portion and a second end portion, the first end portion being mounted pivoting on the first tubular portion around a second pivoting axis, the blocking element being able to assume at least one closed position in which it retains the first tubular portion and the second tubular portion in the unfolded position, and an open position in which it allows the movement into the folded position of the first and second tubular portions by pivoting the second tubular portion relative to the first tubular portion around the first pivoting axis;
- a connection part having a first end portion mounted pivoting on the second end portion of the blocking element around a third pivoting axis, the connection part further having a second end portion mounted pivoting on the second tubular portion around a fourth pivoting axis; and
- a return device configured to bring the blocking element from its open position into its closed position.

In a non-limiting manner, the first and second tubular portions can be portions of the handlebar stem, the handlebar, the frame or even the saddle stem of the folding bicycle. They each preferably have a first end. The first pivoting axis is preferably disposed at the first ends of the first and second tubular portions. The second pivoting axis is preferably disposed at the first end of the first tubular portion.

The blocking element advantageously forms a lever preferably having the shape of a parallelepiped and can comprise an inner recess. In the open position, it is preferably inclined relative to the second tubular portion.

In the folded position, the first and second tubular portions preferably form an angle strictly greater than 0° and preferably less than or equal to 180°. In the folded position, said tubular portions are not aligned and do not extend past the continuation of one another. The blocking element is preferably in the open position when the tubular portions are in the folded position.

In order to place said first and second tubular portions in the unfolded position, it is appropriate to pivot the second tubular portion relative to the first tubular portion around the first pivoting axis, in a first rotation direction, for the purpose of placing said two tubular portions in the continuation of one another, preferably aligned. The connection part initially exerts a force on the second end portion of the blocking element. This causes pivoting of said second blocking element in a first pivoting direction, around the second pivoting axis, which tends to move it away from the second tubular portion.

Secondly, when the fourth pivoting axis crosses over a plane passing through the first pivoting axis and the third pivoting axis, the connection part drives the blocking element in rotation in a second pivoting direction, opposite to the first pivoting direction, around the second pivoting axis. This tends to bring it closer to the second tubular portion. The return device tends to pivot the blocking element in the second pivoting direction by exerting a return force on said blocking element. However, the connection part prevents the pivoting of the blocking element in said second pivoting direction. The blocking element therefore remains in the open position and allows the pivoting of the second tubular portion relative to the first tubular portion.

By continuing the pivoting of the second tubular portion relative to the first tubular portion, said first and second tubular portions are brought into the unfolded position, in which they extend in the continuation of one another. When the first and second tubular portions extend in the continuation of one another, they are preferably placed end-to-end and also preferably aligned. The axes of the first and second tubular portions are then preferably coincident or even merged. As a variant, they can be slightly inclined or offset relative to one another. Preferably, the first ends of the first and second tubular portions are in contact when said tubular portions are in the unfolded position.

Henceforth, the connection part does not prevent the pivoting of the blocking element in the second pivoting direction. Thanks to the proposed solution, the return device, which is constrained, drives the rotation of the blocking element around the second pivoting axis, in the second pivoting direction. The return force exerted by the return device on the blocking element is sufficient to pivot the blocking element so as to move it even closer to the second tubular portion until a closed position, in which it is preferably pressed against said second tubular portion. The return device allows the passage of the blocking element from its open position to its closed position, despite possible resistance imposed by the connection part and possible friction. This passage from the closed position to the open position is also called the "passing the hard point."

Thanks to the proposed solution, the user is not required to manually bring the blocking element into the closed position.

In the closed position, the blocking element is close to the second tubular portion and preferably pressed against said second tubular portion. It preferably extends substantially parallel to said second tubular portion. In this closed position, the blocking element exerts a force on the connection part which transmits this force to the second tubular portion. This force is directed substantially toward the first tubular portion so that it tends to retain the first tubular portion and the second tubular portion in the unfolded position. The blocking element thus effectively retains the first and second tubular portions in the unfolded position, even in the presence of a force tending to pivot the second tubular portion relative to the first tubular portion.

The hinge according to the disclosure greatly facilitates the blocking of the first and second tubular portions in the unfolded position, thanks in particular to the return device which allows automatically placing the blocking element in the closed position. The proposed solution thus allows dispensing with the particularly constraining step of manual placement in the closed position of the blocking element against the second tubular portion, encountered with the devices of the prior art. The user need not push strongly on the blocking element and can unfold the first and second tubular portions and block them in this unfolded position in a single action exerted on the second tubular portion.

The proposed solution thus allows the bicycle to be deployed more rapidly and therefore allows more rapid use of said bicycle.

The hinge according to the disclosure also allows dispensing with the closure problems of the blocking element encountered with prior devices, and particularly the risk that the user forgets to close the blocking element or does not close it correctly. The hinge according to the disclosure consequently ensures blocking of the first and second tubular portions in the unfolded position, thus guaranteeing the safety of the user.

In addition, the user need not touch the blocking element, so that he does not soil his hands.

To place the blocking element in its open position, it is appropriate to pivot it in the first pivoting direction around the second pivoting axis, so as to move it away from the second tubular portion. When the blocking element is placed in the open position, the second tubular portion can be pivoted relative to the first tubular portion in a second rotation direction, opposite to the first rotation direction, so as to place the first and second tubular portions in the folded position.

Advantageously, the first pivoting axis and the second pivoting axis are parallel and extend on either side of a diameter of the first tubular portion. Thus to unfold the first and second tubular portions, the second tubular portion is pivoted in the first rotation direction, in the direction of the second pivoting axis and the blocking element. In addition, the fourth pivoting axis is moved closer to the second pivoting axis. Moreover, the blocking element is pivoted between the open position and the closed position in the second pivoting direction, in the direction of the first pivoting axis.

Preferably, the first pivoting axis and the fourth pivoting axis extend on either side of a diameter of the second tubular portion. Thus, the second, third and fourth axes extend advantageously on the same side of the first and second tubular portions. In addition, when the first and second tubular portions are in the unfolded position and when the blocking element is in the closed position, the second and fourth pivoting axes are disposed in proximity to one another.

In a non-limiting manner, the second tubular portion can comprise a mounting portion protruding from an outer surface of said second tubular portion and having the fourth pivoting axis passing through it. Thus, the connection part is mounted pivoting on said mounting portion. When the blocking element is in the closed position, said mounting portion preferably extends into a recess provided in the blocking element.

Advantageously, the blocking element is substantially parallel to the connection part when the first and second tubular portions are in the unfolded position. In addition, considered in projection on a plane passing through the second and fourth pivoting axes, the fourth pivoting axis is disposed between said second and third pivoting axes. In the closed position, the blocking element therefore exerts a force on the connection part, which it transmits to the second tubular portion, which is directed toward the second pivoting axis. The connection part opposes the pivoting of the second tubular portion into an unfolded position.

Also preferably, the connection part extends in the recess provided in the blocking element when the latter is in the closed position.

Preferably, the first, second, third and fourth pivoting axes are substantially parallel to one another.

Advantageously, when the blocking element is in the closed position, the first pivoting axis and the third pivoting axis extend on the same side of a plane passing through the second pivoting axis and the fourth pivoting axis. In this position, the blocking element is preferably pressed against the second tubular portion.

On the contrary, when the blocking element is in the open position, the first and third pivoting axes preferably extend on either side of said plane passing through the second and fourth pivoting axes. The intermediate position of the blocking element, in which the second, third and fourth pivoting axes are aligned, is called the hard point position.

The force exerted by the return device allows the blocking element to pass from the open position to the closed position, and therefore passing the third pivoting axis from a first side of the plane passing through the second and fourth pivoting axes to a second side of said plane.

When the first and second tubular portions are in the unfolded position and when the blocking element is in the closed position, a force exerted on the second tubular portion aiming to pivot it in the second rotation direction, to fold it, induces a force on the connection part, transmitted to the blocking element, preferably directed slightly toward the second tubular portion. This force tends to pivot the blocking element further in the second pivoting direction, and therefore to bring it closer to the second tubular portion, which allows retaining the first and second tubular portions in the unfolded position. The blocking element thereby effectively retains the tubular portions in the unfolded position, even when a force is exerted on the tubular portions. This prevents involuntary folding of the tubular portions and guarantees the safety of the user.

Advantageously, the return device comprises a torsion spring extending around the second pivoting axis and cooperating with the first tubular portion and the blocking element. The torsion spring is selected so as to be able to supply a sufficient force to bring the blocking element from the open position into the closed position. When the blocking element is in the open position, the torsion spring is constrained and tends to pivot the blocking element toward the second tubular portion, so as to pass the "hard point" and press the blocking element against the second tubular portion, once the first and second tubular portions are placed in the unfolded position.

The torsion spring is advantageously supported on an outer surface of the first tubular portion.

Preferably, the torsion spring is also supported on an outer surface of the blocking element or on an inner surface of a supporting portion of the blocking element.

Preferably, the connection part is a stem extending between the blocking element and the second tubular portion. This stem allows guiding the rotation of the blocking element during the pivoting of the second tubular portion relative to the first tubular portion.

Advantageously, the connection part has an adjustable length, by means of which the user can adjust the length of the connection part so as to reduce clearance which can appear between the connection part, the second tubular portion and the blocking element. The adjustment of the length of the connection part also allows adjusting the force necessary for passing the blocking element from the open position to the closed position and therefore conversely, for passing the hard point.

Preferably, the hinge further comprises a locking device having a locked position in which it retains the blocking element in the closed position and an unlocked position in which it allows the blocking element to be placed in the open position. When the locking device is placed in the locked position, it opposes the pivoting of the blocking element, around the second pivoting axis, in the second pivoting direction tending to move it away from the second tubular portion. One advantage is to prevent the involuntary opening of the blocking element which risks causing folding of the first and second tubular portions. The locking device improves the safety of the user.

In the locked position, the locking device preferably holds the blocking element pressed against the second tubular portion or in proximity to the second tubular portion.

Preferably, the second tubular portion comprises a locking portion and the locking device is mounted on the blocking element and comprises an engagement member configured to cooperate with the locking portion when the locking device is placed in the locked position.

The locking portion preferably protrudes from the second tubular portion. In a non-limiting manner, the engagement member can be configured to cooperate with an opening provided in the locking portion. As a variant, the locking portion can have the shape of a hook.

Still in a non-limiting manner, the engagement member can have the shape of a pin or a hook configured to engage with the locking portion when the locking device is in the locked position.

Preferably, the locking device comprises an actuating portion configured to place the locking device in the unlocked position when it is actuated.

Advantageously, the locking device comprises a return member configured to retain the locking device in the locked position, when the actuating portion is not actuated. One advantage is to allow the user to easily place the locking device in the unlocked position while still reducing the risk that it will be placed in the unlocked position involuntarily. The actuating portion is preferably disposed on a lateral wall of the blocking element. The return member can consist of a spring element or a spring blade.

In a non-limiting manner, the locking device can be mounted pivoting or sliding between the locked and the unlocked position.

The disclosure applies moreover to a saddle step including the hinge according to the disclosure.

The disclosure also apples to a bicycle frame including at least one hinge according to the disclosure.

In addition, the disclosure applies to a bicycle handlebar including at least one hinge according to the disclosure.

BRIEF DESCRIPTION OF THE DRAWINGS

The disclosure will be better understood upon reading the description that follows of an embodiment of the disclosure, given by way of a non-limiting example, with reference to the appended drawings, in which.

DESCRIPTION OF THE EMBODIMENTS

The disclosure relates to a hinge for folding bicycles.

Figure 1:
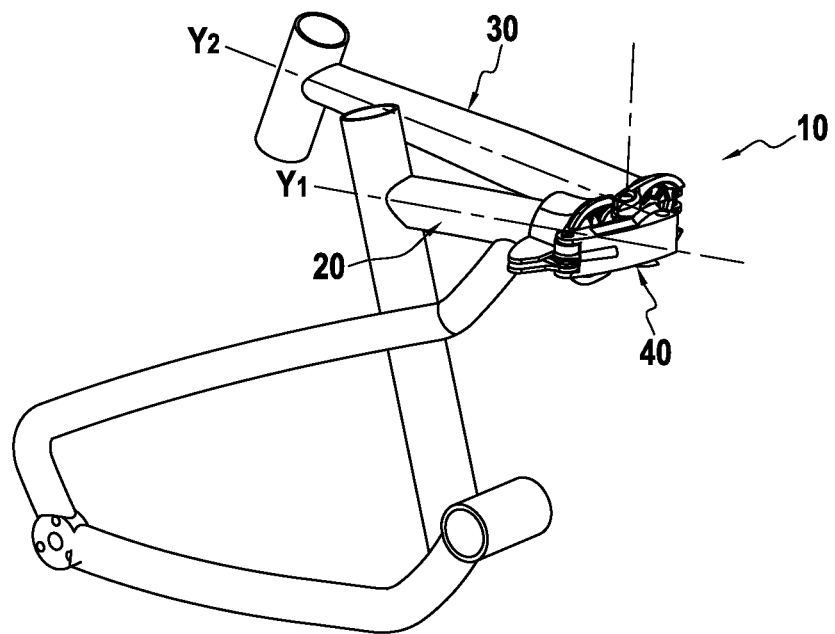
FIG. 1 illustrates a hinge for a folding bicycle according to the disclosure, in the folded position.
Figure 2:
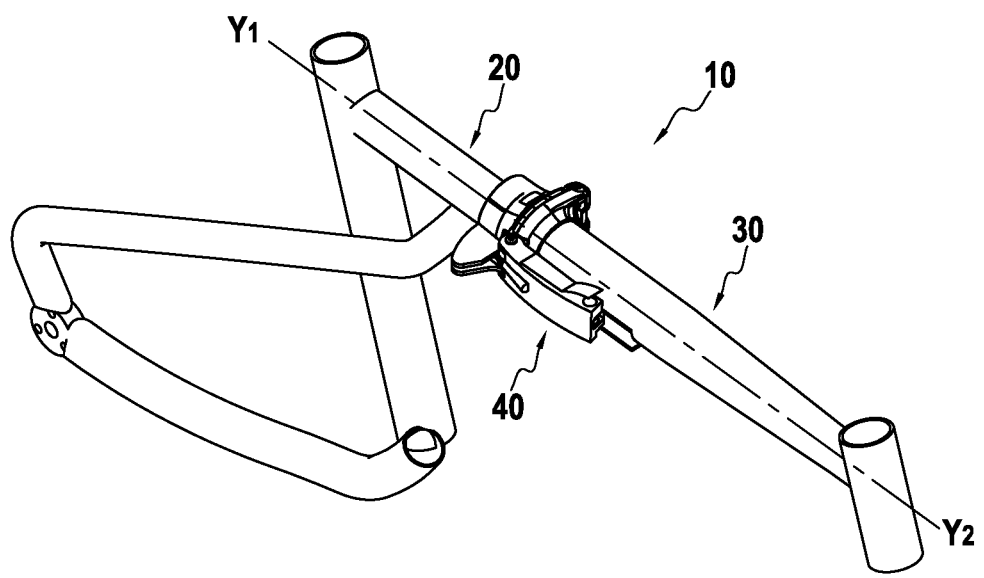
FIG. 2 illustrates the hinge of FIG. 1 in the unfolded position.

One example of a hinge 10 according to the disclosure, allowing two tubular portions to be placed in the folded position or the unfolded position, is given in FIGS. 1 and 2.

Figures 3, 4:
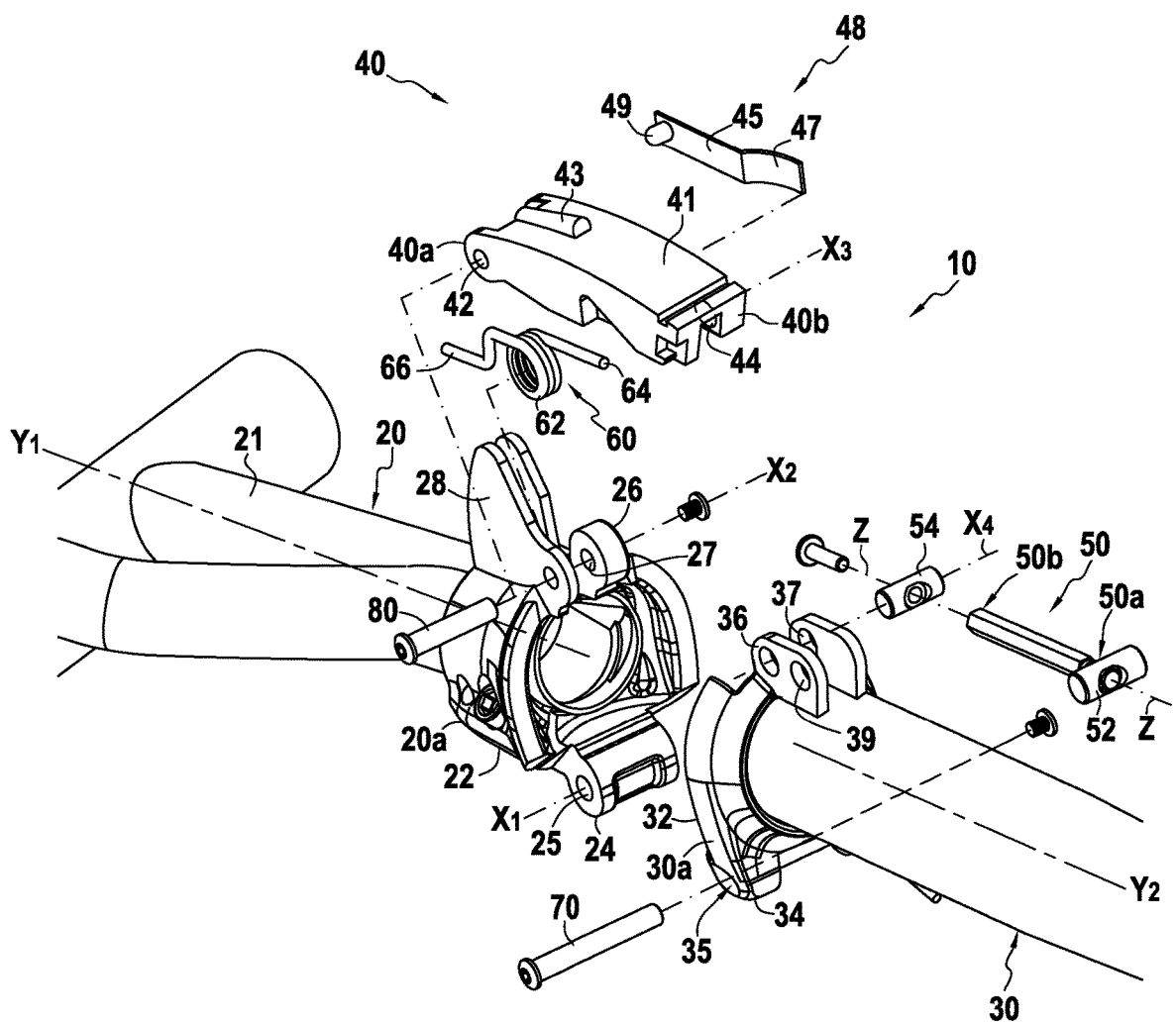
FIG. 3 is an exploded view of the hinge of FIG. 1.
FIG. 4 illustrates the blocking element and the connection part of the hinge of FIG. 1, when the blocking element is in the open position.

Referring to FIG. 3, it is noted that the hinge 10 comprises a first tubular portion 20, a second tubular portion 30, one blocking element 40, one connection part 50 and one return device 60 configured to bring the blocking element 40 from an open position to a closed position.

In this non-limiting example, the first tubular portion 20 and the second tubular portion 30 are tubular portions of the frame of a bicycle. Without departing from the scope of the disclosure, these first and second tubular portions 20, 30 can be tubular portions of the saddle stem, of the handlebar stem or even of the handlebar of the bicycle. The first tubular portion 20 is cylindrical and extends in a first longitudinal direction $Y_1$. The second tubular portion 30 is also cylindrical and extend in a second longitudinal direction $Y_2$.

The first tubular portion 20 comprises an outer surface 21. It also comprises a first end 20a equipped with a first sleeve 22. The first tubular portion 20 further comprises a first mounting portion 24 protruding from the sleeve 22 with a first opening 25 passing through it extending along a first pivoting axis $X_1$. The first tubular portion 20 also includes a second mounting portion 26 protruding from the first sleeve 22 and diametrically opposite relative to the first mounting portion 24. Said second mounting portion 26 has a second opening 27 passing through it extending along a second pivoting axis $X_2$.

Moreover, the first tubular portion 20 comprises a pair of fins 28 protruding from the first sleeve 22, transversely to the first longitudinal direction $Y_1$ of the first tubular portion 22. Said fins 28 are disposed in proximity to the second mounting portion 26 and diametrically opposite relative to the first mounting portion 24.

Moreover, the second tubular portion 30 comprises a first end 30a equipped with a second sleeve 32. The second tubular portion 30 comprises a third mounting portion 34, protruding from the second sleeve 32 and with a third opening 35 passing through it extending parallel to the first opening 25.

The hinge 10 according to the disclosure comprises a first dowel 70 configured to extend in the first opening 25 provided in the first mounting portion 24 of the first tubular portion 20 and in the third opening 35 provided in the third mounting portion 34 of the second tubular portion 30. Thus, the third mounting portion 34 cooperates with the first mounting portion 24 of the first tubular portion 20 so that the second tubular portion 30 is mounted pivoting on respect to the first tubular portion 20 around the first pivoting axis $X_1$.

Moreover, the second tubular portion 30 comprises a fourth mounting portion 36 with a fourth opening 37 passing through it. The mounting portion 36, which also forms a locking portion 36, further has a fifth opening 39 passing through it.

Referring to FIG. 4, it is noted that the blocking element 40 has substantially the shape of a rectangular parallelepiped. It forms a lever and includes an outer surface 41 as well as a sheath 43 protruding from said outer surface 41 substantially parallel to said outer surface 41.

As can be seen in FIG. 4, the blocking element 40 has a first end portion 40a and a second end portion 40b, opposite to the first end portion 40a. The first end portion 40a of the blocking element 40 has a first opening 42 passing through it and the second end portion 40b of the blocking element 40 has a second opening 44 passing through it extending substantially parallel to the first opening 42, along a third pivoting axis $X_3$. A recess 46 is provided in the blocking element 40.

The hinge 10 according to the disclosure comprises a second dowel 80 configured to extend in the second opening 27 provided in the second mounting portion 26 of the first tubular portion 20 and in the first opening 42 of the first end portion of the blocking element 40. Thus, the first end portion 40a of the blocking element 40 cooperates with the second mounting portion 26 of the first tubular portion 20 so that the first end portion 40a of the blocking element 40 is mounted pivoting relative to the first tubular portion 20 around the second pivoting axis $X_2$.

The connection part 50 has the shape of a stem having a length L and extending along a stem axis Z. The length L of the connection part is preferably adjustable. Said connection part 50 has a first end portion 50a and a second end portion 50b opposite to the first end portion 50a. The first end portion 50a of the connection part is equipped with a first connection cylinder 52 extending in a direction transverse to the stem axis Z. The second end 50b of the connection part is equipped with a second connection cylinder 54 extending in a direction transverse to the stem axis Z, substantially parallel to the first connection cylinder 52.

The first connection cylinder 52 extends in the second opening 44 passing through the second end portion 40b of the blocking element 40. Thus, the first end portion 50a of the connection part 50 is mounted pivotally to the second end portion 40b of the blocking element 40, around the third pivoting axis $X_3$.

The second connection cylinder 54 extends in the third opening 37 of the third mounting portion 36 of the second tubular portion 30. Thus, the second end portion 50b of the connection part 50 is mounted pivotally on the second tubular portion 30 around the fourth pivoting axis $X_4$.

The first $X_1$, second $X_2$, third $X_3$ and fourth $X_4$ pivoting axes are substantially parallel to one another. The first pivoting axis $X_1$ and the second pivoting axis $X_2$ are diametrically opposed and extend on either side of the first tubular portion 20. Likewise, the third pivoting axis $X_3$ and the first pivoting axis $X_1$ are diametrically opposed and extend on either side of the second tubular portion 30.

In addition, the connection part 50 extends between the second end portion 40b of the blocking element 40 and the first end 30a of the second tubular portion 30. The blocking element 40 extends between the first end portion 50a of the connection part 50 and the first end 20a of the first tubular portion 20.

The return device 60 consists of a torsion spring, or helical spring, comprising a plurality of coils 62, a first support end 64 and a second support end 66. The coils 62 extend around the first dowel 80 and therefore around the second pivoting axis $X_2$. In addition, said coils 62 extend between the fins 28 of the first tubular portion 20. The first support end 64 is configured to extend in the sheath 43. In a non-limiting manner, the second support end 66 is configured to be supported on the outer surface 21 of the first tubular portion 20.

According to the disclosure, when it is constrained, said return device 60 tends to pivot the blocking element 40 around the second pivoting axis $X_2$, toward the second tubular portion 30.

Without departing from the scope of the disclosure, the first support end 64 of the return device 60 can be supported direction on the outer surface 41 of the blocking element 40. As a variant, the blocking element 40 could comprise a support portion configured so that said support portion and the blocking element extend on either side of the second pivoting axis $X_2$. In this configuration, the first support end 64 of the return device 60 can be supported on the inner surface of said support portion, so as to pivot the blocking element toward the second tubular portion.

Moreover, in a non-limiting manner, the hinge 10 comprises a locking device 48 configured to be mounted pivotally on the blocking element 40. The locking device 48 comprises a return member 45, formed by a spring blade cooperating with a lateral face of the blocking element 40. The locking device also comprises an engagement member 49 configured to extend in the recess 46 of the blocking element 40. The locking device 48 further comprises an actuating portion 47 configured to pivot the return member and move the engagement member 49 to the outside of the blocking member, when it is actuated.

Figure 5:
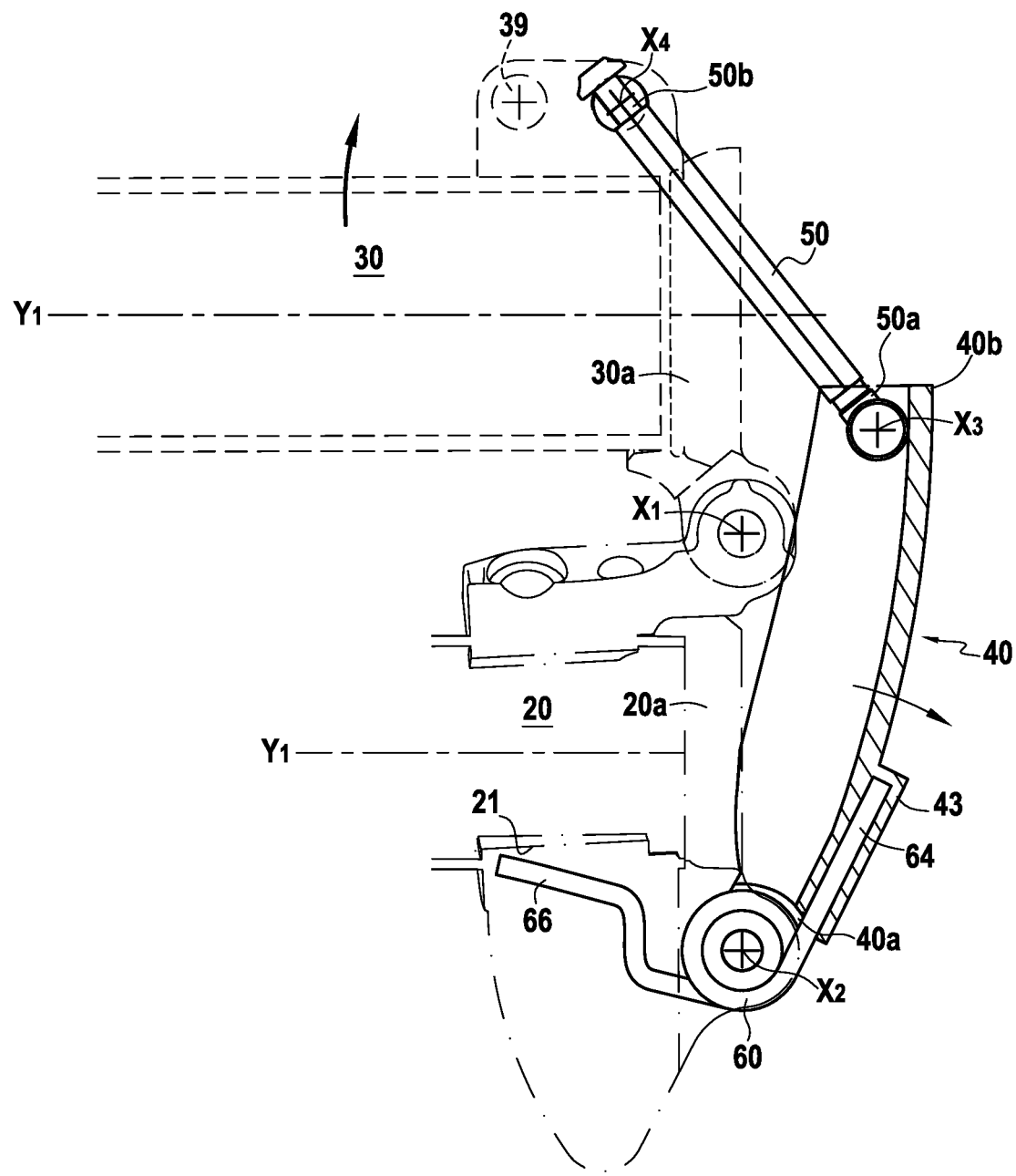
FIG. 5 illustrates the hinge of FIG. 1 in the unfolded position, in side view.

The placement in the unfolded position of the hinge 10 is illustrated in FIGS. 5 to 9. In FIG. 5, the first and second tubular portions 20, 30 do not extend in the continuation of one another and are therefore in the folded position. They form an acute angle between them and are not aligned. This folded position corresponds to a storage position of the bicycle allowing the bulk of said bicycle to be reduced in order to store it or to transport it. In this non-limiting example, in the folded position, the first and second longitudinal directions $Y_1$, $Y_2$ of the first and second tubular portions 20, 30 are substantially parallel and not merged. The two tubular portions do not extend in the continuation of one another. In addition, in said folded position, said first and second longitudinal directions $Y_1$, $Y_2$ form an acute angle relative to one another.

In addition, in this folded position, the return device 60 is slightly constrained. The blocking element 40 is in an open position, so that it allows the pivoting of the second tubular portion 30 relative to the first tubular portion 20 around the first pivoting axis $X_1$.

To place the first and second tubular portions 20, 30 in the unfolded position, it is appropriate to pivot the second tubular portion 30 relative to the first tubular portion 20, around the first pivoting axis $X_1$, in a first rotation direction indicated by a large arrow in FIG. 5. This pivoting tends to align said first and second tubular portions 20, 30. To accomplish this pivoting the user can seize the second tubular portion with a single hand and pivot it.

Figure 6:
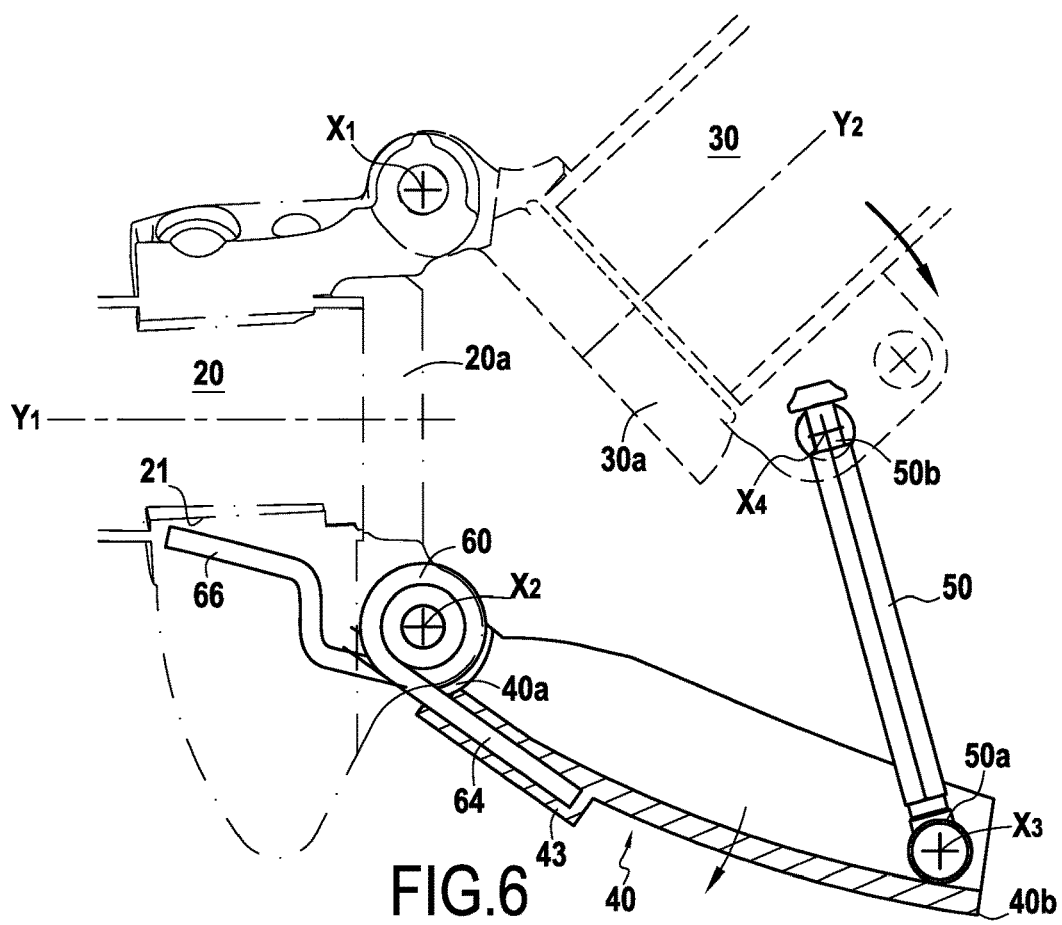
FIG. 6 illustrates the hinge of FIG. 5, in which the second tubular portion has been slightly pivoted.

In the first place, this pivoting illustrated by the passage from FIG. 5 to FIG. 6, causes a movement of the connection part 50 which then exerts a force on the second end 40b of the blocking element 40. This causes pivoting of said blocking element 40 in a first pivoting direction indicated by the small arrow in FIG. 6, around the second pivoting axis $X_2$, which tends to move it away from the second tubular portion 30. The distance separating the first pivoting axis $X_1$ and the third pivoting axis $X_3$ increases with the pivoting of the blocking element 40.

Inasmuch as the return device 60 is slightly constrained, it exerts a small return force on the blocking element 40, tending to pivot it around the second pivoting axis $X_2$ in a second pivoting direction, opposite to the first pivoting direction indicated by the small arrow. This return force exerted by the return device 60 on the blocking element 40 is, however, sufficiently small to allow the user to pivot the second tubular portion 30 in the first rotation direction and the blocking element 40 in the first pivoting direction, without difficulty.

The pivoting of the blocking element 40 in this first pivoting direction tends moreover to pivot the first support end 64 of the return device 60 in the first pivoting direction, as illustrated by the passage from FIG. 5 to FIG. 6, while the second support end 66 of the return device remains supported against the outer surface 21 of the first tubular portion 20. This has as a consequence the additional constraint of the return device 60.

As noted on FIG. 6, the second pivoting axis $X_2$ and the third pivoting axis $X_3$ extend on the same side of a plane passing through the first pivoting axis $X_1$ and through the fourth pivoting axis $X_4$.

Secondly, the user causes the second tubular portion 30 to pivot further relative to the first tubular portion 20 in the first rotation direction indicated by the large arrow in FIG. 6. When the third pivoting axis $X_3$ crosses said plane passing through the first pivoting axis $X_1$ and the fourth pivoting axis $X_4$, the second end portion 50b of the connection part 50, and therefore the fourth pivoting axis $X_4$, is brought closer to the first end portion 40a of the blocking element 40, and therefore of the second pivoting axis $X_2$.

The connection part 50 then drives the blocking element 40 in rotation in the second pivoting direction, opposite to the first pivoting direction, around the second pivoting axis $X_2$, so that the distance between the first pivoting axis $X_1$ and the third pivoting axis $X_3$ decreases. This tends to bring the blocking element 40 closer to the second tubular portion 30.

The return device 60 always tends to pivot the blocking element 40 in the second pivoting direction by exerting a return force on said blocking element 40.

Figure 7:
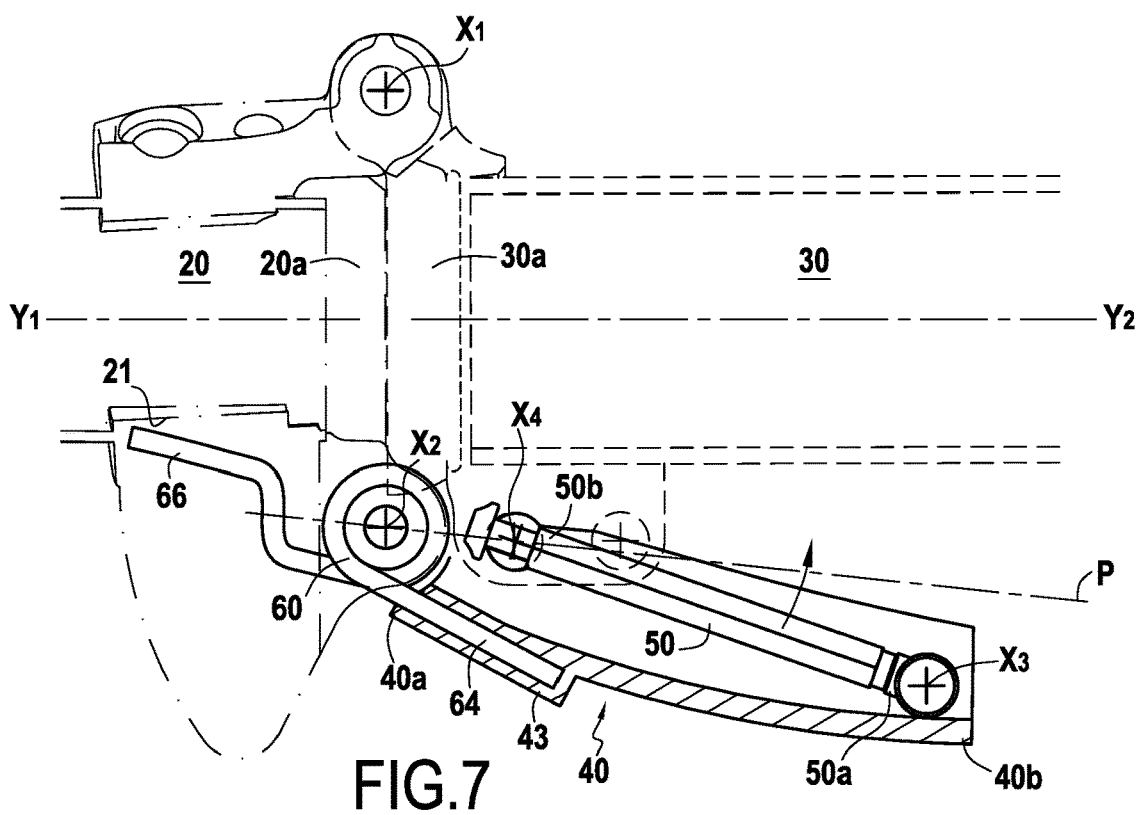
FIG. 7 illustrates the hinge of FIG. 5, in which the first and second tubular portions are in the unfolded position and the blocking element is in the open position.

By continuing the pivoting of the second tubular portion 30 relative to the first tubular portion 20, around the first pivoting axis $X_1$, in the first rotation direction, said first and second tubular portions 20, 30 are brought into the unfolded position. In this unfolded position, they extend in the continuation of one another, aligned as illustrated in FIG. 7. The first longitudinal direction $Y_1$ of the first tubular portion 20 is substantially merged with the second longitudinal direction $Y_2$ of the second tubular portion 30. The first ends 20a, 30a of the first and second tubular portions are in contact with one another.

In FIG. 7, the blocking element 40 is always in the open position, so that it always allows pivoting of the second tubular portion 30 relative to the first tubular portion 20. The blocking element 40 is inclined relative to the second longitudinal direction $Y_2$ of the second tubular portion 30. In addition, the first pivoting axis $X_1$ and the third pivoting axis $X_3$ extend on either side of a plane P passing through the second pivoting axis $X_2$ and through the fourth pivoting axis $X_4$.

When the first and second tubular portions are in the unfolded position and the blocking element is in the open position, the connection part 50 no longer prevents the pivoting of the blocking element 40 in the second pivoting direction. Thus the return device 60, which is constrained, drives in rotation the blocking element 40 around the second pivoting axis $X_2$, in said second pivoting direction indicated by the small arrow in FIG. 7, toward the second tubular portion 30. The distance between the second pivoting axis $X_2$ and the fourth pivoting axis $X_4$ remains constant and the connection part 50 is driven in rotation by the blocking element 40 around the fourth pivoting axis $X_4$.

Figure 8:
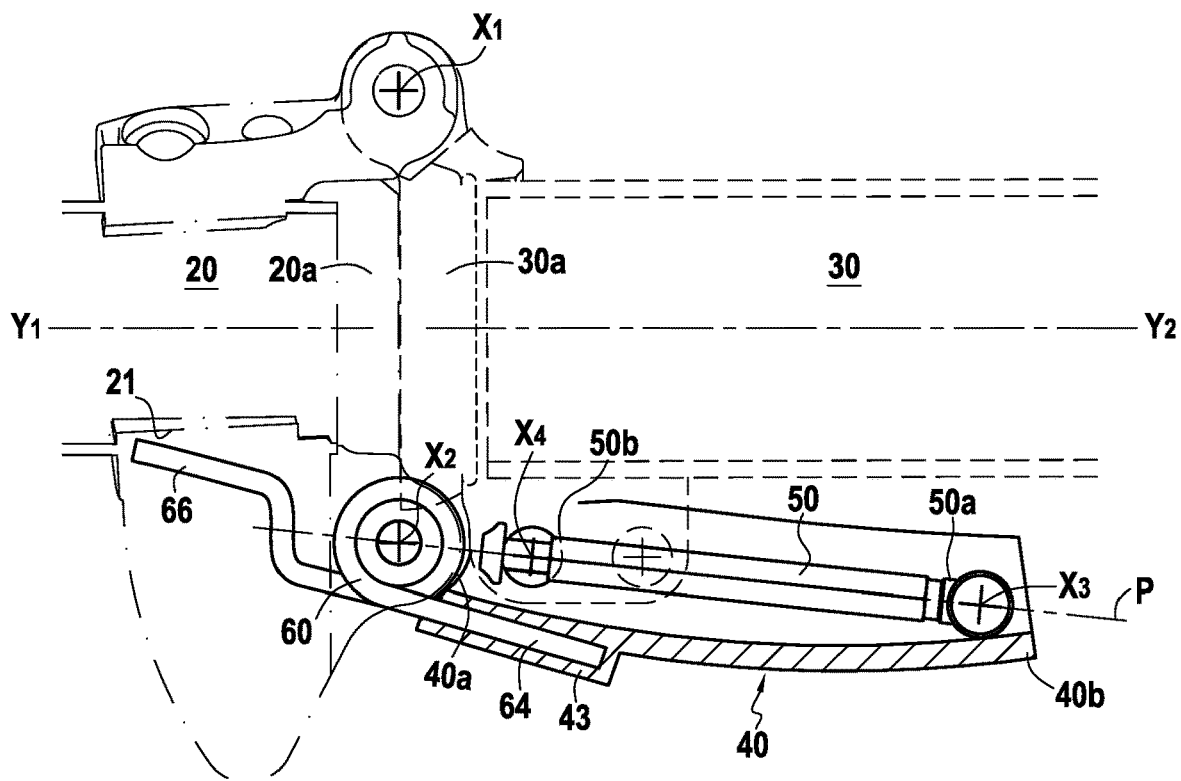
FIG. 8 illustrates the hinge of FIG. 5, in which the blocking element is in the "hard point" position.

When the second, third and fourth pivoting axes $X_2$, $X_3$, $X_4$ are brought into an aligned position, as illustrated in FIG. 8, the connection part 50 exerts a resisting force slightly opposing the pivoting of the blocking element 40 in the second pivoting direction, toward its closed position. This position is called the "hard point." The resisting force exerted by the connection part is however smaller than the force exerted by the return device 60 on the blocking element 40, so that thanks to the proposed solution, the return device 60 allows the blocking element 40 to pass this "hard point." The third pivoting axis $X_3$ then passes on the other side of the plane P.

Figure 9:
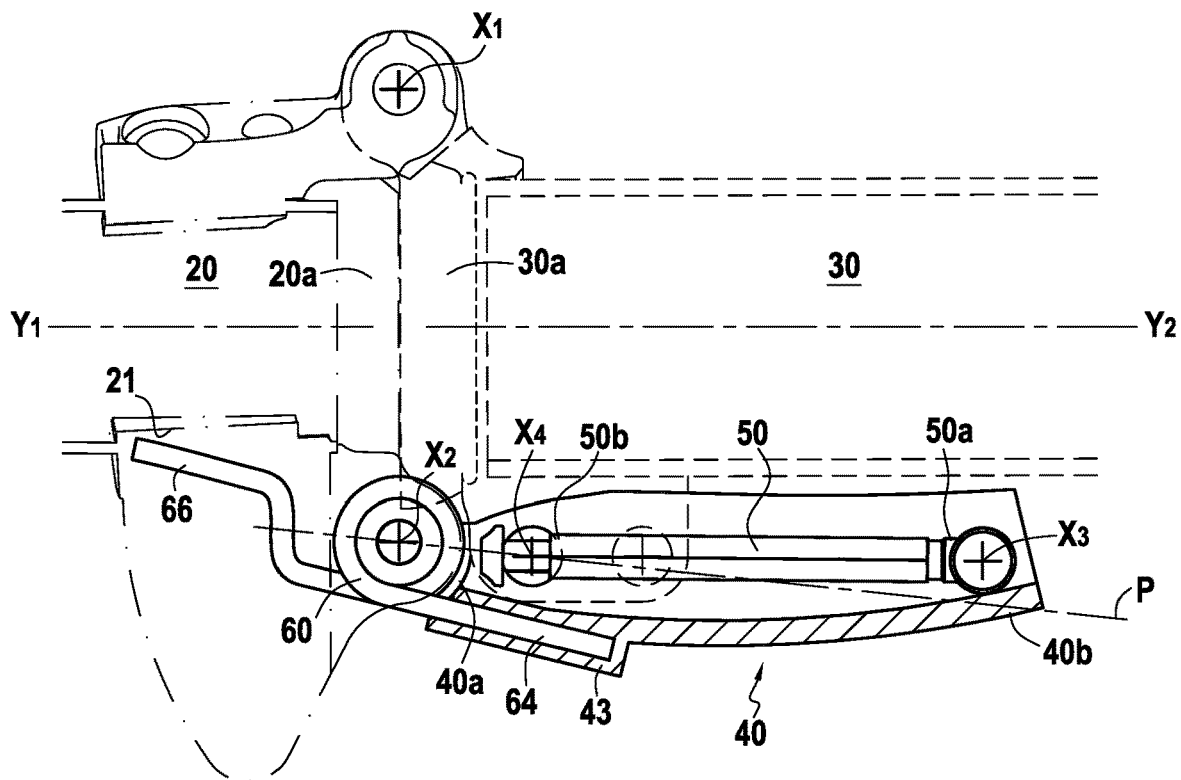
FIG. 9 illustrates the hinge of FIG. 5, in which the blocking element is in the closed position.

The return device 60 then allows bringing the blocking element 40 from its open position to its closed position, as illustrated in FIG. 9. This passage from the open position to the closed position occurs automatically and without the intervention of the user.

In the closed position, the blocking element 40 is pressed against the second tubular portion 30 or against the fourth mounting portion 36 of the second tubular portion 30, and extends substantially parallel to the second longitudinal direction $Y_2$ of the second tubular portion 30. The first and third pivoting axes $X_1$, $X_3$ extend on the same side of the plane P passing through the second and fourth pivoting axes $X_2$, $X_4$.

Figure 10:
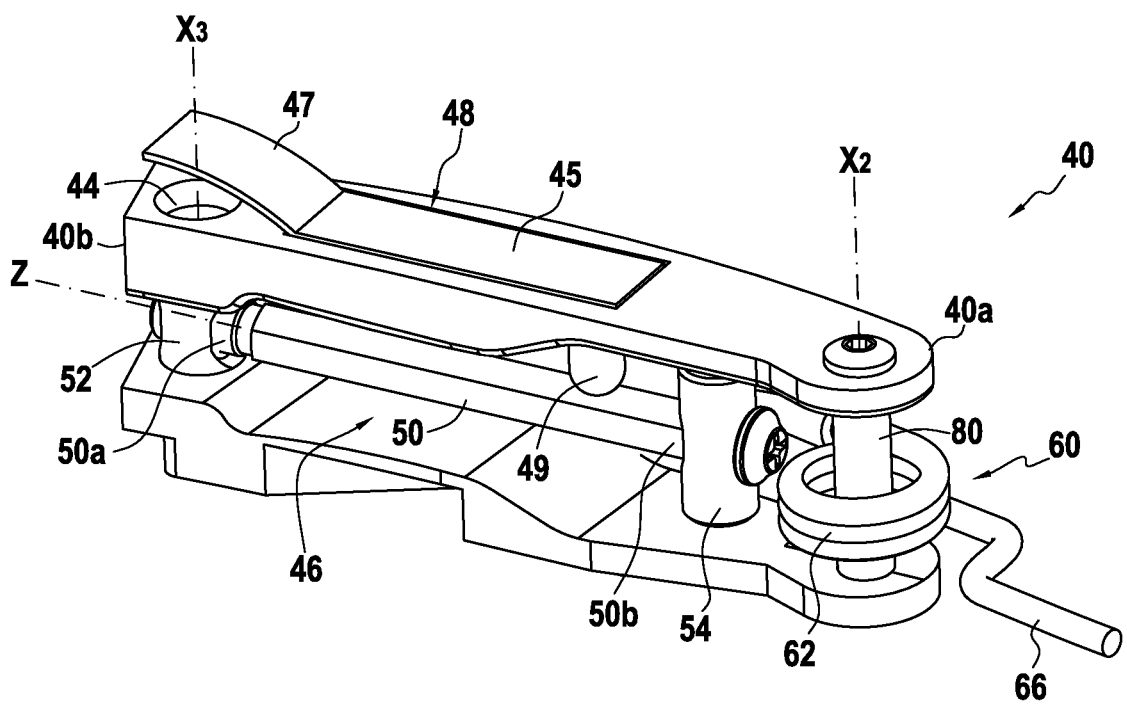
FIG. 10 illustrates the blocking element and the connection part of the hinge of FIG. 5, when the blocking element is in the closed position.

Referring to FIG. 10, it is noted that in this closed position, the connection part 50 extends in the housing 46 provided in the blocking element 40. The blocking element 40 exerts a force on the first end portion 50a of the connection part 50, which transmits this force to the second tubular portion 30. This force is directed substantially toward the first tubular portion 20 so that it retains the first tubular portion and the second tubular portion in the unfolded position. If a force is exerted on the second tubular portion 30, tending to bring the latter into the folded position, the force is transmitted to the blocking element 40 via the connection part 50. This force tends to bring the blocking element even closer to the second tubular portion and therefore to retain said blocking element in the closed position and the first and second tubular portions in the unfolded position.

The blocking element 40 therefore effectively retains the first and second tubular portions 20, 30 in the unfolded position, even in the presence of a force tending to pivot the second tubular portion 30 relative to the first tubular portion 20.

Moreover, the locking device 48 is automatically placed in the locked position so that the engagement member 49 cooperates with the fifth opening 39 of the fourth mounting portion 36, which forms the locking portion 36, of the second tubular portion 30. The return member 45 allows retaining the locking device in the locked position. The blocking element 40 is consequently retained in the closed position, so that it cannot be accidentally placed in the open position.

To place the locking device 48 in the unlocked position, it is appropriate to press the actuating portion 47, so as to pivot the return member 45 and cause the engagement member 49 to leave the fifth opening 39. The blocking element 40 can then be placed in the open position, so as to be able to place the first and second tubular portions 20, 30 in the folded position.

In order to place the first and second tubular portions 20, 30 in the folded position, the user must manually move the blocking element 40 so as to pivot it around the second pivoting axis $X_2$, in the first pivoting direction. Said blocking element 40 is then moved away from the second tubular portion 30. It again crosses the "hard point" and is thus brought from its closed position into its open position in which it allows the pivoting of the second tubular portion 30 relative to the first tubular portion 20. The user can then pivot said second tubular portion around the first pivoting axis $X_1$ in a second rotation direction, until a folded position.

The invention claimed is:

1. A hinge for a folding bicycle comprising:
   a first tubular portion;
   a second tubular portion mounted pivoting relative to the first tubular portion around a first pivoting axis, the second tubular portion comprising a locking portion, the first and second tubular portions being able to assume an unfolded position in which they extend in the continuation of one another and a folded position in which they form an acute angle between them;
   a blocking element having a first end portion and a second end portion, the first end portion being mounted pivoting on the first tubular portion around a second pivoting axis, the blocking element being able to assume at least one dosed position in which it retains the first tubular portion and the second tubular portion in the unfolded position and an open position in which it allows the movement into the folded position of the first and second tubular portions by pivoting of the second tubular portion relative to the first tubular portion around the first pivoting axis;
   a connection part having a first end portion mounted pivoting on the second end portion of the blocking dement around a third pivoting axis, the connection part further having a second end portion mounted pivoting on the second tubular portion around a fourth pivoting axis;
   a return device, comprising a biasing element, configured to bring the blocking dement from its open position to its closed position; and
   a locking device having a locked position in which it retains the blocking element in the closed position and an unlocked position in which it allows the blocking element to be placed in the open position, the locking device being mounted on the blocking element and comprising an engagement member configured to cooperate with the locking portion when the locking device is placed in the locked position.

2. The hinge according to claim 1, wherein the first pivoting axis and the second pivoting axis are parallel and extend on either side of a diameter of the first tubular portion.

3. The hinge according to claim 1, wherein the first pivoting axis (X.sub.1) and the fourth pivoting axis extend on either side of a diameter of the second tubular portion.

4. The hinge according to claim 1, wherein the blocking element is substantially parallel to the connection part when the first and second tubular portions are in the unfolded position.

5. The hinge according to claim 1, wherein the first, second, third and fourth pivoting axes are substantially parallel to one another.

6. The hinge according to claim 5, wherein, when the blocking element is in the closed position, the first pivoting axis and the third pivoting axis extend on the same side of a plane passing through the second pivoting axis and the fourth pivoting axis.

7. The hinge according to claim 1, wherein the return device comprises a torsion spring extending around the second pivoting axis and cooperating with the first tubular portion and the blocking element.

8. The hinge according to claim 1, wherein the connection part is a stem extending between the blocking element and the second tubular portion.

9. The hinge according to claim 8, wherein the connection part has an adjustable length.

10. The hinge according to claim 1, wherein the locking device comprises an actuating portion configured to place the locking device in the unlocked position when it is actuated.

11. The hinge according to claim 10, wherein the locking device comprises a return member configured to retain the locking device in the locked position, when the actuating portion is not actuated.

12. A bicycle saddle stem including at least one hinge according to claim 1.

13. A bicycle frame comprising at least one hinge according to claim 1.

14. A bicycle handlebar including at least one hinge according to claim 1.

15. A bicycle including at least one hinge according to claim 1.

* * * * *